(12) United States Patent
Kalateh Ahmad et al.

(10) Patent No.: US 11,015,431 B2
(45) Date of Patent: May 25, 2021

(54) ECCENTRIC FERRITE COILS FOR RANGING APPLICATIONS

(71) Applicant: Halliburton Energy Services, Inc., Houston, TX (US)

(72) Inventors: Akram Ahmadi Kalateh Ahmad, Bedford, MA (US); Burkay Donderici, Houston, TX (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 16/330,434

(22) PCT Filed: Jan. 27, 2017

(86) PCT No.: PCT/US2017/015412
§ 371 (c)(1),
(2) Date: Mar. 5, 2019

(87) PCT Pub. No.: WO2018/140039
PCT Pub. Date: Aug. 2, 2018

(65) Prior Publication Data
US 2020/0308956 A1    Oct. 1, 2020

(51) Int. Cl.
*E21B 47/0228*    (2012.01)
*G01V 3/28*    (2006.01)
*E21B 43/24*    (2006.01)

(52) U.S. Cl.
CPC ............ *E21B 47/0228* (2020.05); *G01V 3/28* (2013.01); *E21B 43/2406* (2013.01)

(58) Field of Classification Search
CPC . G01R 33/20; G01V 3/32; G01V 3/28; G01V 3/18; A61B 5/055; G01N 24/00;
(Continued)

(56) References Cited

U.S. PATENT DOCUMENTS

| 3,829,724 A * | 8/1974 | Sutton ..................... G01P 3/487 310/67 R |
| 4,319,104 A * | 3/1982 | Decroix ................... H01H 1/16 200/275 |

(Continued)

FOREIGN PATENT DOCUMENTS

| WO | 2014089402 | 6/2014 |
| WO | 2016108840 | 7/2016 |

OTHER PUBLICATIONS

ISRWO International Search Report and Written Opinion for PCT/US2017/015412 dated Oct. 24, 2017.
(Continued)

*Primary Examiner* — Giovanni Astacio-Oquendo
(74) *Attorney, Agent, or Firm* — Benjamin Ford; C. Tumey Law Group PLLC

(57) ABSTRACT

A method and system for wellbore ranging. A method for wellbore ranging may comprise placing a coil antenna in a wellbore, wherein the coil antenna may comprise one or more coil windings, and the coil windings comprise a magnetic material. The method may further comprise measuring a characteristic of an induced electromagnetic field with the coil antenna. A system for wellbore ranging may comprise an electromagnetic ranging tool which may further comprise a coil antenna, wherein the coil antenna comprises one or more coil windings, and wherein the coil windings comprise a magnetic material. The method may further comprise an information handling system, wherein the information handling system may be operable to measure a characteristic of an induced electromagnetic field with the coil antenna.

18 Claims, 5 Drawing Sheets

(58) Field of Classification Search
CPC . E21B 47/0228; E21B 43/2406; E21B 47/092
USPC ............... 324/200, 300, 301, 307, 309, 338
See application file for complete search history.

(56) References Cited

U.S. PATENT DOCUMENTS

| | | | |
|---|---|---|---|
| 9,874,085 B2 | 1/2018 | Wu et al. | |
| 9,879,521 B2 | 1/2018 | Wu et al. | |
| 10,139,515 B2* | 11/2018 | Golla | G01V 3/26 |
| 2009/0084536 A1* | 4/2009 | Kenison | E21B 47/024 |
| | | | 166/66 |
| 2010/0044108 A1 | 2/2010 | Bespalov et al. | |
| 2010/0155139 A1* | 6/2010 | Kuckes | E21B 47/024 |
| | | | 175/45 |
| 2011/0308794 A1 | 12/2011 | Bittar et al. | |
| 2011/0308859 A1 | 12/2011 | Bittar et al. | |
| 2012/0109527 A1 | 5/2012 | Bespalov | |
| 2014/0374159 A1* | 12/2014 | McElhinney | E21B 43/305 |
| | | | 175/45 |
| 2016/0041294 A1* | 2/2016 | Wu | E21B 33/13 |
| | | | 324/338 |
| 2016/0216397 A1 | 7/2016 | Donderici et al. | |
| 2018/0291723 A1* | 10/2018 | Chang | G01V 3/10 |
| 2018/0328165 A1* | 11/2018 | Ahmad | E21B 47/092 |

OTHER PUBLICATIONS

M. Bittar, H. Wu and S. Li, "New Logging While Drilling Ranging Technique for SAGD: Theory and Experiment", SPE 159405, Oct. 2012.

A.F. Kuckes, T. Lautzenhiser, A. G. Nekut and R. Sigal, "An Electromagnetic Survey Method for Directionally Drilling a Relief Well into a Blown Out Oil or Gas Well", SPE 10946-PA, Jun. 1984.

Oil & Gas Journal, "New Rotating Magnet Ranging Systems Useful in Oil Sands, DBM Developments" Feb. 23, 2004.

Halliburton, Solutions in Action: Pioneer Natural Resources Uses Active Magnetic Ranging to Avoid Risk of Wellbore Collision, 2008, available at https://www.halliburton.com/content/dam/ps/public/ss/contents/Case_Histories/web/H06436.pdf.

* cited by examiner

ECCENTRIC FERRITE COILS FOR RANGING APPLICATIONS

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") application, wherein the second wellbore may be an injection wellbore while the target wellbore may be a production wellbore. Yet another application may be where knowledge of the target wellbore's location may be needed to avoid collision during drilling of the second wellbore.

Electromagnetic ranging is one technique that may be employed in subterranean operations to determine direction and distance between two wellbores. Devices and methods of electromagnetic ranging may be used to determine the position and direction of a target wellbore by an electromagnetic transmitter and a pair of sensors in a logging device and/or drilling device while part of a bottomhole assembly in the second wellbore. Additional electromagnetic ranging methods may energize a target wellbore by a current source on the surface and measure the electromagnetic field produced by the target wellbore on a logging and/or drilling device in the second wellbore, which may be disposed on a bottomhole assembly. However, this method may be problematic as it requires access to the target wellbore. Methods in which energizing may occur from the second wellbore without access to the target wellbore may be used but may be limited due to current transmitter and receiver configurations.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to a system and method for electromagnetic ranging. More particularly, a system and method for determining the position and direction of a target wellbore using an electromagnetic ranging tool, which may comprise two sensors, separated by a small radial distance, which may rotate around the electromagnetic ranging tool. The disclosure describes a system and method for electromagnetic ranging that may be used to determine the position and direction of a target wellbore by an electromagnetic transmitter and a pair of sensors in an electromagnetic ranging tool using gradient measurements. Electromagnetic ranging tools may comprise a tubular assembly, which may comprise a coil antenna transmitter and/or receivers. Without limitation, coil antenna transmitter and/or receivers may comprise any number of coil windings. Coil windings may comprise conductive material that may allow for current to move through the coil windings. Current may flow through the coil windings in any direction, which may produce an electromagnetic field. Transmission of electromagnetic fields by the transmitter coil and recording of signals by the receivers may be controlled by an information handling system.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
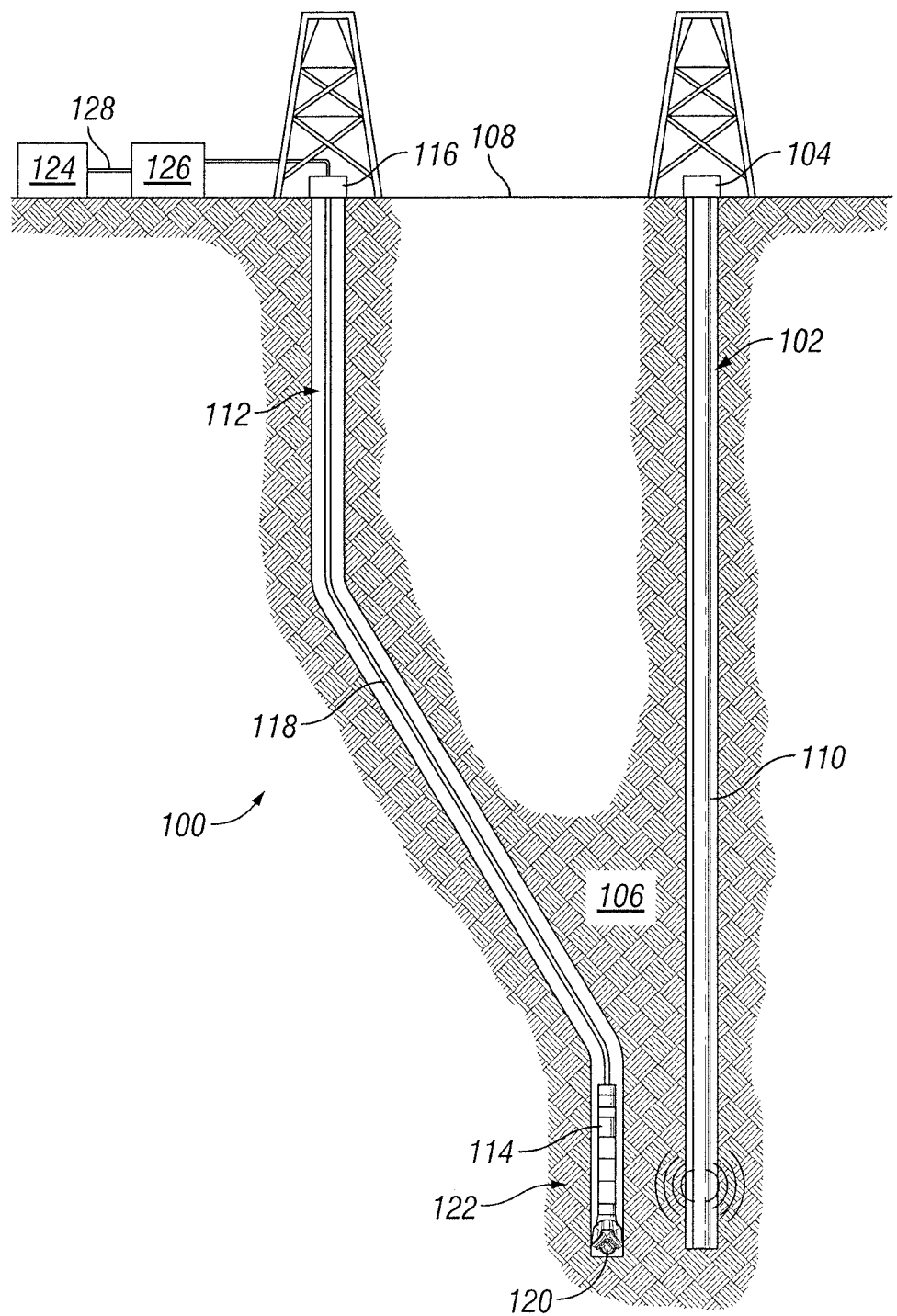
FIG. 1 is a schematic illustration of an electromagnetic ranging system.

FIG. 1 illustrates an electromagnetic ranging system 100. As illustrated, a target wellbore 102 may extend from a first wellhead 104 into a subterranean formation 106 from a surface 108. While target wellbore 102 is shown as being generally vertical in nature, it should be understood that target wellbore may include horizontal, vertical, slanted, curved, and other types of wellbore geometries and orientations. Target wellbore 102 may be cased or uncased. A conductive member 110 may be disposed within target wellbore 102 and may comprise a metallic material that may be conductive. By way of example, conductive member 110 may be a casing, liner, tubing, or other elongated metal tubular disposed in target wellbore 102. Determining the location, including position and direction, of conductive member 110 accurately and efficiently may be useful in a variety of applications. For example, target wellbore 102 may be a "blowout" well. Target wellbore 102 may need to be intersected precisely by a second wellbore 112 in order to stop the "blowout." In examples, second wellbore 112 may be used in applications when drilling a second wellbore 112 parallel to an existing target wellbore 102, for example, in SAGD applications. Additionally, electromagnetic ranging system 100 may be used in second wellbore 112 to detect target wellbore 102, and/or additional wells, during drilling operations to avoid collision. In examples, nearby target wellbore 102 may not be accessible and/or any information about nearby positions and/or structure of target wellbore 102 may not be available. As detailed below, electromagnetic ranging tool 114 may be used to determine the range to target wellbore 102.

With continued reference to FIG. 1, second wellbore 112 may also extend from a second wellhead 116 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 118 may begin at second wellhead 116 and traverse second wellbore 112. A drill bit 120 may be attached to a distal end of drill string 118 and may be driven, for example, either by a downhole motor and/or via rotation of drill string 118 from surface 108. Drill bit 120 may be a part of bottomhole assembly 122 at distal end of drill string 118. As illustrated, bottomhole assembly 122 may comprise electromagnetic ranging tool 114 and drill bit 120 coupled to a distal end of electromagnetic ranging tool 114. While not illustrated, bottomhole assembly 122 may further comprise one or more of a mud motor, power module, steering module, telemetry subassembly, and/or other sensors and instrumentation as will be appreciated by those of ordinary skill in the art. As will be appreciated by those of ordinary skill in the art, bottomhole assembly 122 may be a measurement-while drilling or logging-while-drilling system.

Without limitation, electromagnetic ranging system 100 may comprise an electromagnetic ranging tool 114. Electromagnetic ranging tool 114 may be a part of bottomhole assembly 122. Electromagnetic ranging tool 114 may be used for determine the distance and direction to target wellbore 102. Additionally, electromagnetic ranging tool 114 may be connected to and/or controlled by information handling system 124, which may be disposed on surface 108 and/or downhole. In examples, information handling system 124 may communicate with electromagnetic ranging tool 114 through a communication line (not illustrated) disposed in (or on) drill string 118. In examples, wireless communication may be used to transmit information back and forth between information handling system 124 and electromagnetic ranging tool 114. Information handling system 124 may transmit information to electromagnetic ranging tool 114 and may receive as well as process information recorded by electromagnetic ranging tool 114. Electromagnetic ranging tool 114 may also include components, such as a microprocessor, memory, amplifier, analog-to-digital converter, input/output devices, interfaces, or the like, for receiving and processing signals received by electromagnetic ranging tool 114 and then transmitting the processed signals to surface 108. Alternatively, raw measurements from electromagnetic ranging tool 114 may be transmitted to surface 108.

Any suitable technique may be used for transmitting signals from electromagnetic ranging tool 114 to surface 108, including, but not limited to, mud-pulse telemetry, acoustic telemetry, and electromagnetic telemetry. While not illustrated, bottomhole assembly 122 may include a telemetry subassembly that may transmit telemetry data to surface 108. Without limitation, a transmitter in the telemetry subassembly may be operable to generate pressure pulses in the drilling fluid that propagate along the fluid stream to surface 108. At surface 108, pressure transducers (not shown) may convert the pressure signal into electrical signals for a digitizer 126. Digitizer 126 may supply a digital form of the telemetry signals to an information handling system 124 via a communication link 128, which may be a wired or wireless link. The telemetry data may be analyzed and processed by information handling system 124. For example, the telemetry data may be processed to location of target wellbore 102. With the location of target wellbore 102, an operator may control the bottomhole assembly 122 while drilling second wellbore 112 to intentionally intersect target wellbore 102, avoid target wellbore 102, and/or drill second wellbore 112 in a path parallel to target wellbore 102.

Figure 2A:
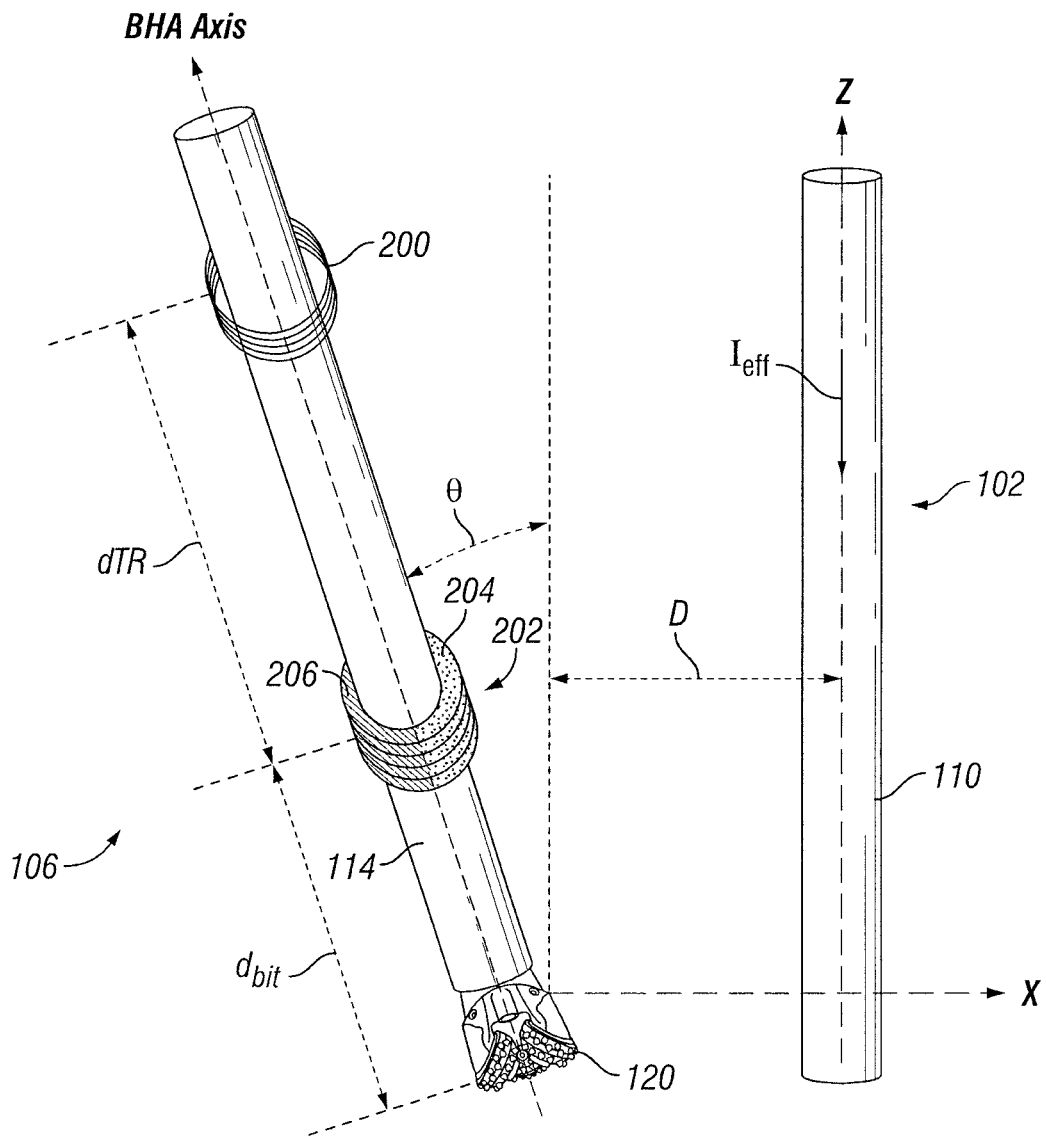
FIG. 2a is a schematic illustration of bottomhole assembly moving toward a target wellbore.

Turning now to FIG. 2a, electromagnetic ranging tool 114 is illustrated in more detail. Electromagnetic ranging tool 114 may be used to determine one or more ranging parameters, such as location of target wellbore 102, including direction and distance to target wellbore 102. Direction to target wellbore 102 may be represented by the inclination angle θ of electromagnetic ranging tool 114 with respect to target wellbore 102. Distance to target wellbore 102 may be represented by the distance D from drill bit 120 to target wellbore 102. As illustrated, electromagnetic ranging tool 114 may be used in determining location of target wellbore 102, including distance D, and inclination angle θ. Conductive member 110 may be disposed in target wellbore 102. Electromagnetic ranging tool 114 may comprise a coil antenna transmitter 200, a receiver 202, and a drill bit 120. In examples, drill bit 120 may be disposed at a distal end of electromagnetic ranging tool 114. Without limitation, coil antenna transmitter 200, receiver 202, and drill bit 120 may be connected and/or controlled by information handling system 124. The distance from coil antenna transmitter 200 and receiver 202 may be denoted by dTR. The distance between drill bit 120 and the closest component, whether coil antenna transmitter 200 or one of the receivers 202, denoted by $d_{bit}$. In examples, electromagnetic ranging tool 114 may comprise a plurality of coil antenna transmitters 200 200 and/or a plurality of receivers 202. The proper arrangement of coil antenna transmitter 200 and/or receiver 202 may provide appropriate signal differences between a received signal at receivers 202. The received signal may need a high enough signal ratio between the signals scattered from target wellbore 102 to the signal directly created by coil antenna transmitter 200. While the receiver 202 on FIG. 2a is illustrated as coils, it is noted here that the concepts that are described herein are valid for any type of receiver antenna other than coils. As an example, receivers 202 may include receiver coils, magnetometers, wire antenna, toroidal antenna or azimuthal button electrodes.

Without limitation, receiver 202 may comprise magnetic material. For example, magnetic material may comprise ferrite. In examples, conductive material may be eccentrically disposed around receiver 202. Thus, a portion of receiver 202 may comprise of a magnetic ferrite core and another portion may comprise of a non-magnetic dielectric core. The volume percentage of each material may range from five percent to ninety percent, which may depend on subterranean formation 106. Without limitation, receiver 202 may mechanically rotate around electromagnetic ranging tool 114 and/or synthetically rotate around electromagnetic ranging tool 114. Synthetically rotating may comprise exciting different portions of receiver 202 in a clock wise and/or counter-clock wise movement. Circular movement, mechanically and/or synthetically, may allow for multiple measurements to be made at multiple angles during operation of electromagnetic ranging tool 114. Measurements may be taken in a stationary position and/or when electromagnetic ranging tool 114 may be moving though subterranean formation 106.

As will be appreciated, electromagnetic ranging tool 114 may be run in subterranean formations 106 with different formation properties. As such, electromagnetic ranging tool 114 may be optimized for different formation properties, including different operating frequencies and different transmitter-receiver spacing dTR for the different operating frequencies. By way of example, electromagnetic ranging tool 114 may operate at different frequencies making use of a receiver configuration that may be most suitable for formation resistivity. This may be done by placing multiple receivers 202 on electromagnetic ranging tool 114. Receivers 202 may measure voltage or other characteristics of an electromagnetic field, for example. Each receivers 202 may be operable at a different frequency. The frequency may be optimized based on the transmitter-receiver spacing dTR. While transmitter-receiver spacing dTR may vary based on a number of factors, dTR may range from about five feet to about one hundred fifty feet, from about twenty five feet to about one hundred feet, or from about seventy five feet to about one hundred feet. In some examples, dTR may range from about eighty six feet to about ninety six feet. The transmitter-receiver spacing dTR may be used at a variety of different frequencies, including from 0.5 to about 5 kilohertz, from about 1 to about 10 kilohertz, or from about 50 kilohertz to about 100 kilohertz. It should be understood that frequencies and transmitter-receiver spacing dTR outside these disclosed ranges may also be suitable, depending on the application.

In examples, coil antenna transmitter 200 may produce an electromagnetic field, which may excite current (produce eddy current) within conductive member 110 of target wellbore 102. The current within conductive member 110 may produce a secondary electromagnetic field. One or more components of the secondary electromagnetic field (e.g., magnitude) may be detected by receivers 202 of electromagnetic ranging tool 114. Using these measurements of the secondary magnetic field, the location of target wellbore 102 may be determined. By way of example, the direction and distance of target wellbore 102 may be determined with respect to second wellbore 112. Without limitation, to determine the distance from electromagnetic ranging tool 114 to target wellbore 102 and/or the inclination angle to the target wellbore 102 at least two receivers 202 may be used on electromagnetic ranging tool 114. Receivers 202 may have a magnetic dipole in a certain direction and may only be sensitive to the component of the magnetic field in that direction. Thus, two receivers 202, tilted in different directions, may be used to capture the magnitude of the secondary electromagnetic field. Analyses of the measured secondary electromagnetic field may provide the distance D and inclination angle θ between target wellbore 102 and electromagnetic ranging tool 114. The distance D and inclination angle θ are shown on FIG. 2a.

Figure 2B:
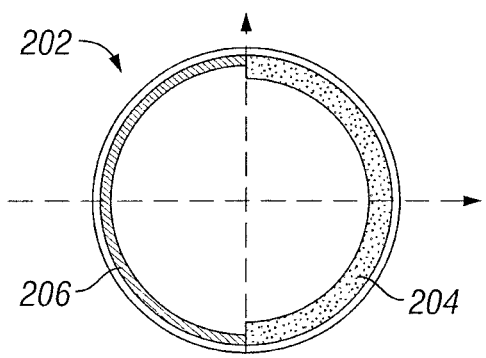
FIG. 2b is a schematic illustration of a receiver with an eccentric magnetic ferrite.

As illustrated in FIG. 2b, receiver 202 may comprise eccentric magnetic ferrite 204 and non-magnetic dielectric material 206. Without limitation, magnetic material may be eccentrically disposed on coil antenna transmitter 200. For example, conductive material may be magnetic ferrite, which may be eccentrically disposed on coil antenna transmitter 200. As illustrated, eccentric magnetic ferrite 204 may comprise half of receiver 202 and non-magnetic dielectric material 206 may comprise an opposing half of receiver 202. In examples, eccentric magnetic ferrite 204 may be thicker on receiver 202 than non-magnetic dielectric material 206. Without limitation, eccentric magnetic ferrite 204 may comprise more and/or less than half of the outer perimeter of receiver 202. Likewise, dielectric material 206 may comprise more and/or less than half of the outer perimeter of receiver 202.

Figure 3:
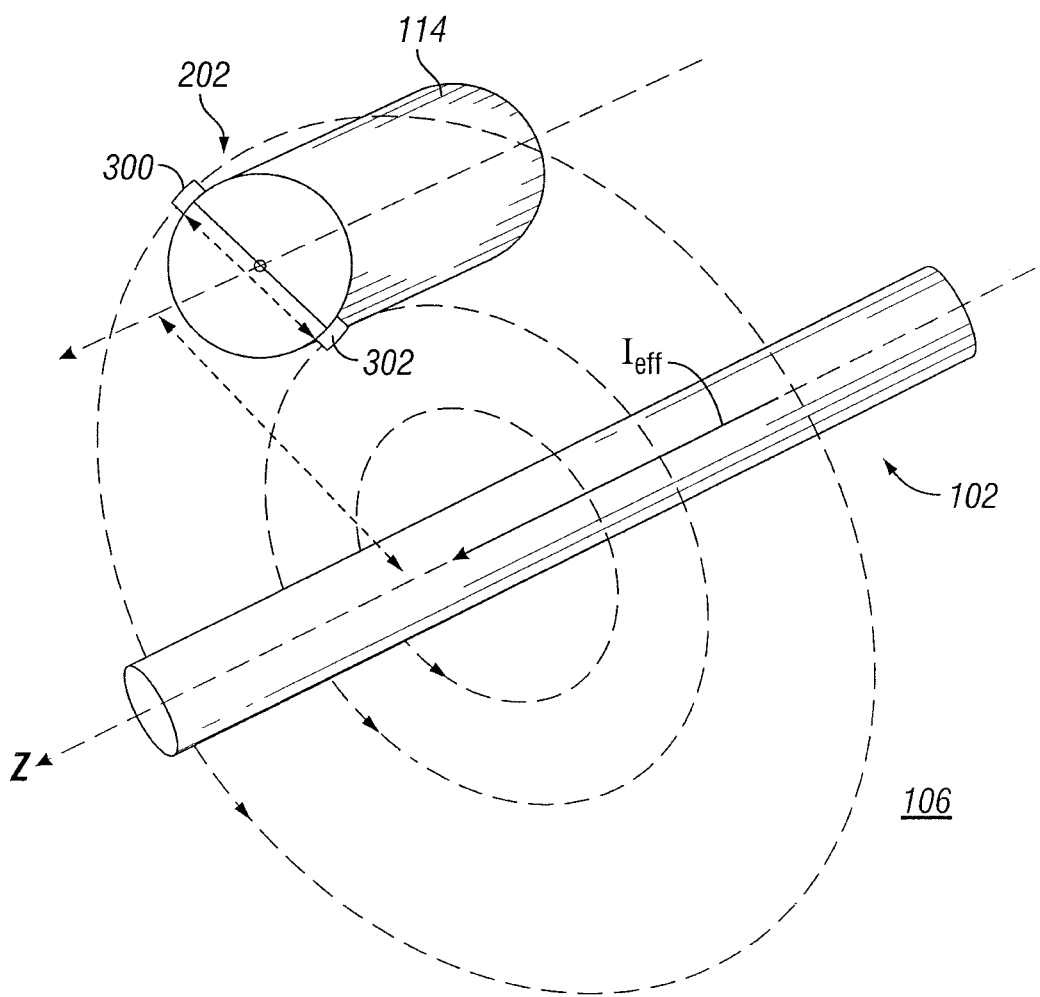
FIG. 3 is a schematic illustration of an electromagnetic ranging tool.

FIG. 3 illustrates electromagnetic ranging tool 114 and target wellbore 102. Electromagnetic ranging tool 114 may be employed to locate target wellbore 102. Without limitation, receiver 202, disposed on electromagnetic ranging tool 114, may comprise a first sensor 300 and a second sensor 302. First sensor 300 and second sensor 302 may be separated along a fixed radial direction, denoted as (delta S), and may be in line with r, where r may be the distance from the center of electromagnetic ranging tool 4 to target wellbore 102. Without limitation, first sensor 300 and second sensor 302 may comprise coils, solenoids, magnetometers, and/or the like. First sensor 300 may measure the magnetic field and second sensor 302 may be used to calculate the gradient field, or vice versa. Calculation of the gradient field may allow an operator to determine r, the distance between the center of electromagnetic ranging tool 114 and target wellbore 102.

As discussed above, an electromagnetic field may be broadcasted into a subterranean formation 106 by coil antenna transmitters 200 (not illustrated), which may induce an eddy current in target wellbore 102. Target wellbore 102, due to the induced eddy current, may broadcast a secondary magnetic field which may be recorded by first sensor 300 and/or second sensor 302. In examples, first sensor 300 and second sensor 302 may be implemented to determine the distance between electromagnetic ranging tool 114 and target wellbore 102 using gradient measurements. Gradient measurements may be performed as detailed below. In examples, the current on target wellbore 102 may be constant, thus Biot-Savart law reduces to Ampere's law and the magnetic field at a point (insert r) may be given by equation (1) where (insert Ieff) may be an effective current on target wellbore 102 an r is the radial distance from target wellbore 102 to point (insert r).

$$\vec{H}^i(\vec{r}) = \frac{I_{eff}}{2\pi r}\hat{\phi} \tag{1}$$

The gradient of the magnetic field at the same location is given by below:

$$\frac{\partial \vec{H}^i(\vec{r})}{\partial r} \approx -\frac{I_{eff}}{2\pi r^2}\hat{\phi} \tag{2}$$

Taking the ratio, the radial distance to target wellbore 102 may be determined below:

$$r = \left| \frac{\vec{H}^i(\vec{r})}{\frac{\partial \vec{H}^i(\vec{r})}{\partial r}} \right| \tag{3}$$

Equation (3) may be a conventional gradient method to compute ranging distances. However, two sensors may be used to compute a magnetic field and a gradient field measurements. Additionally, a finite difference method may be utilized to calculate the magnetic field strength and the gradient field strength as shown below:

$$\vec{H} = \frac{\vec{H}_1 + \vec{H}_2}{2} \quad (4)$$

$$\frac{\partial \vec{H}}{\partial r} = \frac{\vec{H}_1 + \vec{H}_2}{\Delta S} \quad (5)$$

Where $H_1$ and $H_2$ are the total field measurements at a first sensor 300 and second sensor 302, respectively. As discussed above (delta S) may be the separation between first sensor 300 and second sensor 302, thus Equation (3) may be modified based on the finite difference method to compute the ranging distance r as seen below:

$$r = \left| \frac{\frac{\vec{H}_1 + \vec{H}_2}{2}}{\frac{\vec{H}_1 + \vec{H}_2}{\Delta S}} \right| \quad (6)$$

Assuming receiver 202 may be a coil with an eccentric magnetic ferrite, and the voltage induced in the receiver coil at two different azimuthal angles φ at a known distance, $D_0$, from target wellbore 102, a (insert delta S eff) based on gradient voltage and the average voltage measured at two different azimuthal angles at know distance, $D_0$, may be calculated, as seen below:

$$\Delta S_{eff} = D_0 \left| \frac{V_1 - V_2}{\frac{V_1 + V_2}{2}} \right| \quad (7)$$

In Equation (7), V1 and V2 are the coil voltage at two different azimuths. Once (insert delta S eff) is known, electromagnetic ranging tool 114 may be calibrated and may be used for ranging calculations. For ranging calculations at different depths, electromagnetic ranging tool 114 may need to rotate and measure the induced signal at two different azimuthal angles, which may allow for the calculations of the distance between electromagnetic ranging tool 114 and target wellbore 102 using the gradient formula described above.

In an example, using gradient measurements, target wellbore 102 may be a thin metal with the following properties: σ=$10^6$ S/m, $ε_r$=1, $μ_r$=60, diameter OD=8" and having current I=1 A at frequency 2 kHz. Subterranean formation 106 may be homogeneous with a resistivity of $R_f$=10 Ω·m and $ε_{fr}$=$μ_{fr}$=1. Receiver 202 radius is 4.6" and has N=1 turn. A layer of magnetic ferrite ($μ_r$=1000) with thickness of 0.6" in between receiver 202 and electromagnetic ranging tool 114, which may form an eccentric center, as shown in FIG. 2b. The other half of receiver 202 may be filled by a non-magnetic material (σ=0.01 S/m, $ε_r$=1, $μ_r$=1). Electromagnetic ranging tool 114 may be made of a nonmagnetic metal with radius of 4". Defining an input port on the coil, the voltage that is induced on the coil caused by the current on target wellbore 102 may be measured. Electromagnetic ranging tool 114 may rotate by 180 degrees and the induced voltage is measured again. As disclosed above, utilizing the gradient voltage and the known distance D0=2 m to calculate the $ΔS_{eff}$ (Equation 7). Now the calculated ΔSeff may be used for doing ranging calculation for other distances. For an example, modeling the system for distance D=4 m and calculated the gradient voltage for φ=90 degrees and 270 degrees. By applying the gradient formula (Equation 6) the distance is calculated as Dcalculated=3.55 m. The 10% error is related to the numerical errors of the system modeling and also the approximation applied in the method.

Figure 4:
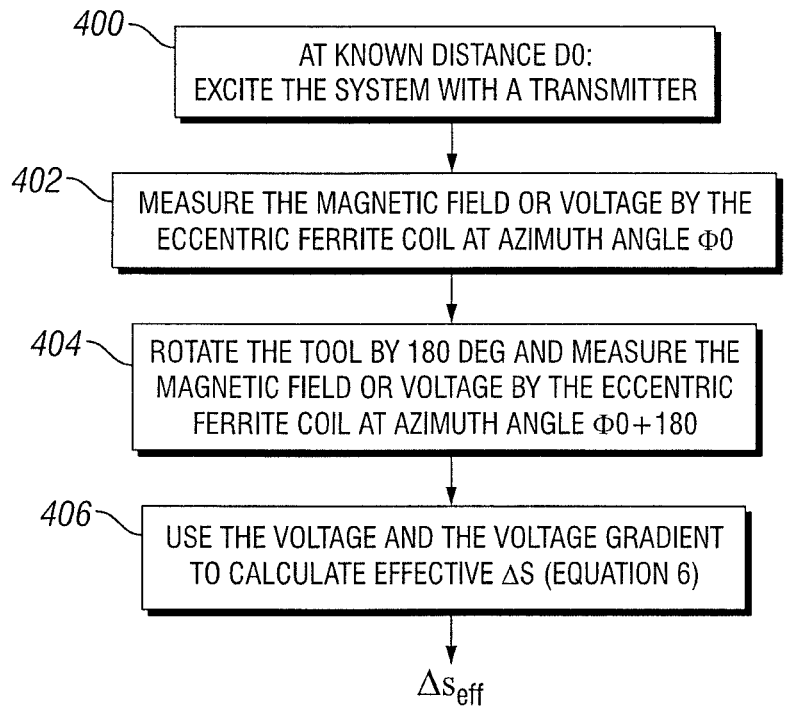
FIG. 4 is an example of a method for calibrating an electromagnetic ranging tool.

FIG. 4 illustrates a diagram of a method in which a receiver 202 comprising eccentric magnetic ferrite 204 and non-magnetic dielectric material 206 may perform gradient measurements for determining the location of a target wellbore 102 with an electromagnetic ranging system 100. Without limitation, two magnetic bias measurements may be taken, which may help find the location of target wellbore 102. As illustrated by block 400, at a known distance D0 electromagnetic ranging system 100 may excite coil antenna transmitter 200. An electromagnetic field may broadcast from coil antenna transmitter 200 into a subterranean formation 106. In block 402, receiver 202, comprising eccentric magnetic ferrite 204, may measure the magnetic field and/or voltage at an azimuth angle wherein $φ_0$ is any starting point for measurement. In block 404, electromagnetic ranging tool 114 may be rotated 180 degrees. A second measurement may be taken, which may measure the magnetic field or voltage, through eccentric magnetic ferrite 204, at an azimuth angle wherein $φ_0$+180 degrees. Using the measured voltage and measured voltage gradient, as illustrated in block 406, an effective delta S may be calculated using Equation (7). Delta S may be used in calibrating electromagnetic ranging tool 114.

Figure 5:
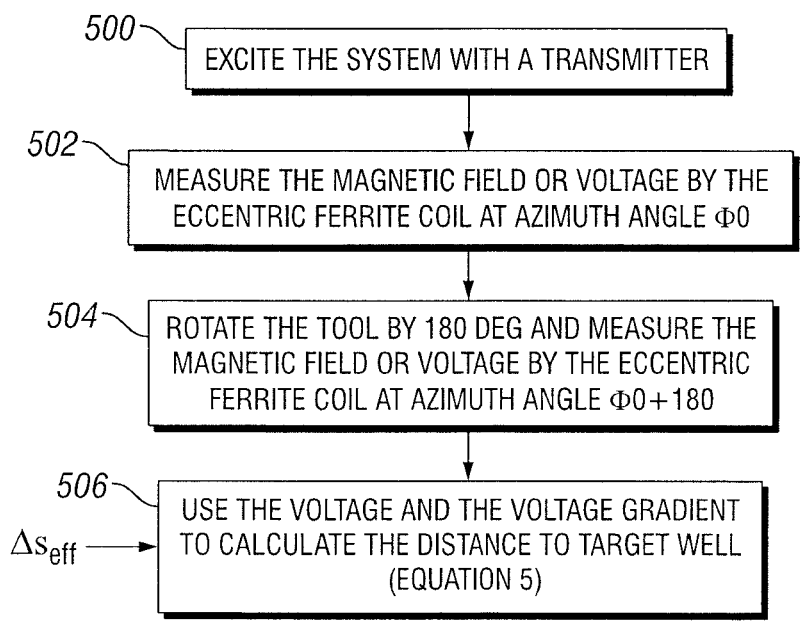
FIG. 5 is an example of a method for determining the distance to a target wellbore.

As illustrated in FIG. 5, a diagram of a method in which a receiver 202 comprising eccentric magnetic ferrite 204 and non-magnetic dielectric material 206 may perform gradient measurements for determining the location of a target wellbore 102 with an electromagnetic ranging system 100. As illustrated by block 500, at a known distance D0 electromagnetic ranging system 100 may excite coil antenna transmitter 200. An electromagnetic field may be broadcasted from coil antenna transmitter 200 into a subterranean formation 106. In block 502, receiver 202, comprising eccentric magnetic ferrite 204, may measure the magnetic field and/or voltage at an azimuth angle wherein $φ_0$ is any starting point for measurement. In block 504, electromagnetic ranging tool 114 may be rotated 180 degrees. A second measurement may be taken, which may measure the magnetic field or voltage, through eccentric magnetic ferrite 204, at an azimuth angle wherein $φ_0$+180 degrees. Using the measured voltage and measured voltage gradient, as illustrated in block 506, an accurate distance to target wellbore 102 may be calculated using Equation (6).

Figure 6:
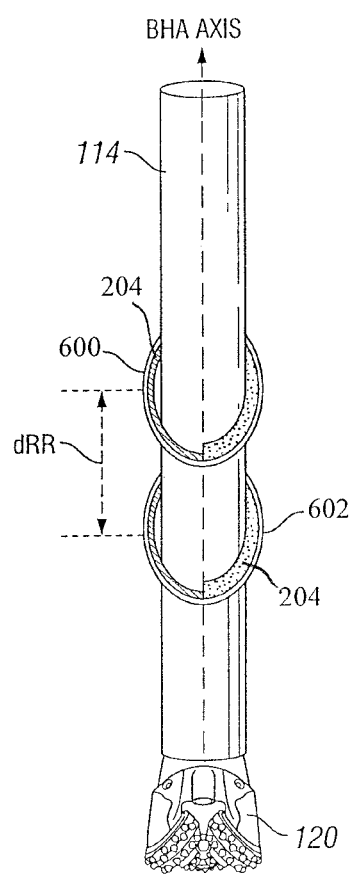
FIG. 6 is a schematic illustration of an electromagnetic ranging tool with two receivers.

FIG. 6 illustrates an example in which two receivers 600 and 602 may be disposed on electromagnetic ranging tool 114 and separated by a distance, which the distance may be defined as dRR. A drill bit 120 may be disposed at a distal end of electromagnetic ranging tool 114. In examples, receivers 600 and 602 may be utilized in gradient measurements. As illustrated, a first receiver 600 and a second receiver 602 may be disposed to mirror each other. For example, first receiver 600 may comprise magnetic ferrite core on one side of electromagnetic ranging tool 114 and second receivers 602 may comprise magnetic ferrite core on the opposing side of electromagnetic ranging tool 114. This may allow electromagnetic ranging tool 114 to perform gradient measurements without rotation receivers 602. In examples, this may allow electromagnetic ranging tool 114 to measure a magnetic field with gradient measurements at a single moment. As disposed, first receiver 600 and second receiver 602 may prevent blind spots in gradient measurements.

In examples, eccentric magnetic ferrite 204 (Referring to FIG. 2) disposed on receiver 602 may be saturated to synthetically produce gradient measurements without rotating receiver 602. For example, a first measurement may be taken with eccentric magnetic ferrite 204 disposed within receiver 602. A static field may be disposed around eccentric magnetic ferrite 204 to saturate eccentric magnetic ferrite 204 and change the magnetic properties. A second measurement may be taken during saturation of eccentric magnetic ferrite 204. A difference between the first and second measurement may be used in gradient measurements to determine the location of target wellbore 102, not illustrated. In examples, multiple eccentric magnetic ferrite 204, over different azimuthal ranges, on receiver 602 may allow for different gradient measurements along different directions by saturating eccentric magnetic ferrite 204. This may also reduce the need for rotation of receiver 602 and prevent blind spots in gradient measurements.

This systems and methods may include any of the various features of the compositions, methods, and system disclosed herein, including one or more of the following statements.

Statement 1: A method for wellbore ranging comprising: placing a coil antenna in a wellbore, wherein the coil antenna comprises one or more coil windings, and the coil windings comprise a magnetic material; and measuring a characteristic of an induced electromagnetic field with the coil antenna.

Statement 2: The method of statement 1, wherein the magnetic material is eccentrically disposed on the coil antenna.

Statement 3: The method of statement 2 or statement 1, further comprising recording a plurality of measurements with at least two different magnetic biases.

Statement 4: The method of any preceding statement, further comprising rotating the coil antenna to record a plurality of measurements at different angles in relation to a target wellbore.

Statement 5: The method of any preceding statement, further comprising applying the plurality of measurements to calibrate an electromagnetic ranging tool comprising the coil antenna.

Statement 6: The method of any preceding statement, further comprising applying the plurality of measurements within a gradient measurement.

Statement 7: The method of any preceding statement, further comprising applying the gradient measurement within ranging measurements.

Statement 8: The method of any preceding statement, further comprising disposing a plurality of coil antennas azimuthally along a bottomhole assembly, wherein the plurality of coil antennas are separated axially, wherein the plurality of coil antennas comprise the coil antenna.

Statement 9: The method of any preceding statement, further comprising applying a recorded measurement within a gradient measurement.

Statement 10: The method of any preceding statement, further comprising applying the gradient measurement within a ranging measurement.

Statement 11: The method of any preceding statement, further comprising recording a plurality of measurements with at least two different magnetic biases.

Statement 12: The method of any preceding statement, further comprising applying the plurality of measurements within a gradient measurement.

Statement 13: The method of any preceding statement, further comprising applying the gradient measurement in a ranging measurement.

Statement 14: The method of any preceding statement, further comprising applying the plurality of measurements to calibrate the coil antenna.

Statement 15: A system for wellbore ranging comprising: an electromagnetic ranging tool comprising a coil antenna, wherein the coil antenna comprises one or more coil windings, and wherein the coil windings comprise a magnetic material; and an information handling system, wherein the information handling system is operable to measure a characteristic of an induced electromagnetic field with the coil antenna.

Statement 16: The system of claim 15, wherein the magnetic material is eccentrically disposed on the coil antenna.

Statement 17: The system of claim 16 or claim 15, wherein the information handling system is operable to record a plurality of measurements from at least two different magnetic biases.

Statement 18: The system of any preceding claim, wherein the electromagnetic ranging tool is operable to rotate the coil antenna and the information handling system is operable to record a plurality of measurements at different angles in relation to a target wellbore.

Statement 19: The system of any preceding claim, wherein the information handling system is operable to apply the plurality of measurements to calibrate the electromagnetic ranging tool.

Statement 20: The system of any preceding claim, wherein the information handling system is operable to apply the recorded measurements within a gradient measurement.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for wellbore ranging comprising:
   disposing an electromagnetic ranging tool with a coil antenna disposed around the electromagnetic ranging tool into a wellbore, wherein the coil antenna comprises one or more coil windings, and the coil windings comprise a magnetic material eccentrically disposed on the coil antenna; and
   measuring a characteristic of an induced electromagnetic field with the coil antenna.

2. The method of claim 1, further comprising recording a plurality of measurements with at least two different magnetic biases.

3. The method of claim 1, further comprising rotating the coil antenna to record a plurality of measurements at different angles in relation to a target wellbore.

4. The method of claim 3, further comprising applying the plurality of measurements to calibrate an electromagnetic ranging tool comprising the coil antenna.

5. The method of claim 4, further comprising applying the plurality of measurements within a gradient measurement.

6. The method of claim 5, further comprising applying the gradient measurement within ranging measurements.

7. The method of claim 1, further comprising disposing a plurality of coil antennas azimuthally along a bottomhole assembly, wherein the plurality of coil antennas are separated axially, wherein the plurality of coil antennas comprise the coil antenna.

8. The method of claim 7, further comprising applying a recorded measurement within a gradient measurement.

9. The method of claim 8, further comprising applying the gradient measurement within a ranging measurement.

10. The method of claim 1, further comprising recording a plurality of measurements with at least two different magnetic biases.

11. The method of claim 10, further comprising applying the plurality of measurements within a gradient measurement.

12. The method of claim 11, further comprising applying the gradient measurement in a ranging measurement.

13. The method of claim 10, further comprising applying the plurality of measurements to calibrate the coil antenna.

14. A system for wellbore ranging comprising:
    an electromagnetic ranging tool comprising a coil antenna, wherein the coil antenna comprises one or more coil windings, and wherein the coil windings comprise a magnetic material, wherein the magnetic material is eccentrically disposed on the coil antenna; and
    an information handling system, wherein the information handling system is operable to measure a characteristic of an induced electromagnetic field with the coil antenna.

15. The system of claim 14, wherein the information handling system is operable to record a plurality of measurements from at least two different magnetic biases.

16. The system of claim 14, wherein the electromagnetic ranging tool is operable to rotate the coil antenna and the information handling system is operable to record a plurality of measurements at different angles in relation to a target wellbore.

17. The system of claim 16, wherein the information handling system is operable to apply the plurality of measurements to calibrate the electromagnetic ranging tool.

18. The system of claim 17, wherein the information handling system is operable to apply the recorded measurements within a gradient measurement.

* * * * *